| United States Patent [19] | [11] | Patent Number: | 5,009,269 |
|---|---|---|---|
| Moran et al. | [45] | Date of Patent: | Apr. 23, 1991 |

[54] WELL CEMENT FLUID LOSS ADDITIVE AND METHOD

[75] Inventors: Larry K. Moran; Thomas R. Murray, both of Ponca City, Okla.

[73] Assignee: Conoco Inc., Ponca City, Okla.

[21] Appl. No.: 560,533

[22] Filed: Jul. 31, 1990

[51] Int. Cl.$^5$ .............................................. E21B 33/14
[52] U.S. Cl. .................... 166/293; 106/778; 166/295
[58] Field of Search ............... 166/293, 295; 106/772, 106/776, 778; 523/130

[56] References Cited

U.S. PATENT DOCUMENTS

| 2,576,955 | 12/1951 | Ludwig | 106/37 |
|---|---|---|---|
| 3,058,520 | 10/1962 | Woodard et al. | 166/293 |
| 3,493,529 | 2/1970 | Krottinger et al. | 166/293 X |
| 3,615,794 | 10/1971 | Nimerick | 166/293 X |
| 4,011,909 | 3/1977 | Adams et al. | 166/293 |
| 4,054,461 | 10/1977 | Martin | 166/293 X |
| 4,054,462 | 10/1977 | Stude | 166/293 X |
| 4,137,093 | 1/1979 | Poblano | 166/293 X |
| 4,569,395 | 2/1986 | Carpenter | 166/293 |

*Primary Examiner*—George A. Suchfield
*Attorney, Agent, or Firm*—Richard W. Collins

[57] ABSTRACT

A fluid loss additive for addition to a cement slurry used in cementing a casing string in a wellbore. The additive reduces loss of water from the slurry into the formation, resulting in a better cement job. The additive is comprised of partially hydrolyzed polyvinyl acetate polymer, calcium sulfate, a crosslinker for the polymer, and optionally a defoamer.

4 Claims, No Drawings

WELL CEMENT FLUID LOSS ADDITIVE AND METHOD

BACKGROUND OF THE INVENTION

1. Field of the Invention

This invention relates to cementing of a casing string in a wellbore, and more particularly to a fluid loss additive for addition to a cement slurry to be used in the cementing job. It is common practice in the art of oil and gas production to cement a casing string or liner in a wellbore by pumping a cement slurry down the wellbore and into the annulus between the casing string and the exposed borehole wall. If the cement comes into contact with permeable formations, and a pressure differential exists toward the formation, then the water in the cement can be forced into the permeable formation. The cement particles are so large that they cannot be pumped into the matrix of the rock, so the solids remain in the annulus. When this happens, the water-to-solids ratio in the cement slurry is reduced, and the cement slurry starts to thicken, with simultaneous cement volume reduction. This unwanted fluid loss from the cement can cause a variety of problems, one of the worst being that the last of the cement cannot be displaced out into the annulus due to the high viscosity of the reduced-water portion of the cement. Because of the magnitude of problems which can be encountered with poor fluid loss control, fluid loss control additives are commonly used in oil well cementing.

The ideal fluid loss additive would be of low cost and have no adverse effects on the performance properties of cement. For a cement slurry to seal the annulus, it must be effectively "placed," then changed from a liquid to a solid in the annulus.

Most fluid loss additives are water-soluble polymers. These polymers work in conjunction with the cement particles themselves to lay down a low permeability filter cake which prevents the fluid in the cement from leaking-off to the formation. The most common fluid loss additives are members of the cellulose family of polymers. However, cellulose polymers retard the set time and increase the viscosity of cement. This retardation of setting can be excessive at low temperatures, and thus, expensive rig time is involved waiting on cement to set. Since these polymers also increase the viscosity, surface mixing can be difficult. To help with surface mixing, extra water is added to lower the surface viscosity. However, when the slurry is pumped down hole, the slurry sees increased temperature, and thermal thinning of the cellulose polymer occurs. This causes the slurry to become too thin, allowing solids to settle out.

Currently used fluid loss additives are satisfactory up to a point, but there is no universal additive that is effective at all temperatures in both freshwater and brine cement slurries.

2. The Prior Art

Polyvinyl alcohol, or more accurately polyvinyl alcohol-polyvinyl acetate polymer, has been used in fluid loss control for some period of time. A very detailed description of polyvinyl alcohol chemistry is found in U.S. Pat. No. 4,569,395 to Carpenter.

U.S. Pat. No. 4,011,909 to Adams et al discloses a well cement slurry including borax and polyvinyl alcohol, although that reference is primarily directed to improving flow properties of the cement.

U.S. Pat. No. 2,576,955 to Ludwig discloses a low-water-loss cement slurry containing polyvinyl alcohol, boric acid, and tributyl phosphate. This reference considers the boric acid to function as a retarder.

None of the above-noted references disclose use of calcium sulfate as part of a fluid loss additive in a cement slurry, and applicants have found that a specific additive package, including polyvinyl alcohol, calcium sulfate, boric acid, and optionally a defoamer, provides good fluid loss control at a variety of conditions and in the presence of both freshwater slurries and brine slurries.

SUMMARY OF THE INVENTION

According to the present invention, a fluid loss additive is provided which is effective at temperatures of up to about 95° C., has limited effect on slurry viscosity, and does not significantly retard cement setting. The additive is comprised of a partially hydrolyzed vinyl acetate polymer, calcium sulfate, a cross-linker for the polymer, and optionally a defoamer.

It is an object of the present invention to provide a unique fluid loss control additive, and a method of using same, in a well cementing system. It is a further object to provide such an additive that will be effective at temperatures up to about 95° C. and in both freshwater and brine systems.

DESCRIPTION OF THE PREFERRED EMBODIMENTS

As used below, the term PVA means a partially hydrolyzed polyvinyl acetate polymer having at least 80 percent of the acetate groups hydrolyzed. PVA has been a desired fluid loss control agent because of its low cost, its lack of a set retarding function, and the fact that it is not totally water soluble, so that its effect on slurry viscosity is minimal. However, the PVA-based materials previously used have been less effective at temperatures above about 50° C. because the PVA becomes essentially water-soluble. Also, PVA has not been particularly effective in cement slurries formulated with fresh water.

The mechanism by which PVA controls fluid loss is believed to be different from that of other fluid loss materials. Most fluid loss additives are high molecular weight polymers that are totally water-soluble and form some type of a structure between the cement particles, which reduces the permeability of the filter cake. PVA is not totally water-soluble below about 50° C., but is, instead, "water-swellable." The individual PVA particles swell and soften to form small gel-balls in the slurry. These gel-balls deform by flattening, and become a part of the filter cake, greatly reducing the filter cake permeability, thus giving extremely good fluid loss control. Because PVA is not totally water-soluble, it does not significantly increase the slurry viscosity. PVA does not retard the set of cement.

Certain cement slurries are not effectively controlled as to fluid loss with PVA at temperatures below 50° C. Freshwater slurries in particular did not perform well with PVA until it was discovered that including a significant amount of calcium sulfate in the fluid loss control package allowed the PVA to function effectively as a fluid loss additive in freshwater systems.

Because of difficulties in manufacturing a PVA with a molecular weight above about 200,000, the use of PVA has heretofore been considered limited to formation temperatures of about 50° C. Applicants have found that the useful temperature can be increased to about 95° C. by including cross-linking materials in the additive. In the presence of boric acid (or other cross-linker) and calcium sulfate (or other sulfates), the PVA behaves as if it has a higher molecular weight. At temperatures much above 95° C., the cross-linked PVA is not thermally stable. However, the cross-linking has greatly increased the useful temperature range of PVA, particularly when the PVA is a high molecular weight (about 190,000) material having about 88 percent of the acetate groups hydrolyzed.

Applicants preferred fluid loss control additive composition is as follows:

| INGREDIENT | PERCENT BY WEIGHT |
| --- | --- |
| 88 Percent Hydrolyzed PVA (MW 190,000) | 30-80 |
| Calcium Sulfate (Hemihydrate) | 10-60 |
| Cross-Linker | Effective amount, not more than 5 |
| Defoamer | 0-5 |

Variations in degree of hydrolysis of the PVA, the molecular weight of the PVA, and the inclusion of up to 10 percent substituents, such as methacrylate, methmethacrylate, or the like, are contemplated.

The calcium sulfate may be in another form such as dihydrate or anhydrite, but should be present in an amount equivalent to from 10 to 60 percent by weight as calcium sulfate hemihydrate.

The cross-linker can be any effective compound such as the known titanates, zirconates, borates, etc.

The defoamer can be any effective material such as polygylcol.

A most preferred fluid loss control additive in accordance with the invention has the following composition:

| INGREDIENT | PERCENT BY WEIGHT |
| --- | --- |
| 88 Percent Hydrolyzed PVA (190,000 MW) | 57 |
| Calcium Sulfate (Hemihydrate) | 40.5 |
| Boric Acid | 1.5 |
| Defoamer | 1 |

Fluid loss control additives within the preferred and the most preferred descriptions set forth above have been tested with a variety of cement systems and at a variety of conditions. The additives have been found to provide excellent fluid loss control when used in a reasonable concentration in cement slurries, typically at about 0.2 to 2.0, and preferably at about 0.75 to 1.25, percent by weight of the cement solids used to prepare the slurries. The additives give only a slight increase in slurry viscosity, and they provide the slurry with a yield point, which is useful in preventing settling from the slurry at static conditions.

We claim:

1. A method of cementing a casing in a wellbore comprising pumping a cement slurry into the annulus between said casing and said wellbore, said cement slurry containing from 0.2 to 2.0 percent by weight, based on the weight of cement solids in said slurry, of an additive consisting essentially of from 30 to 80 percent by weight of partially hydrolyzed high molecular weight vinyl acetate polymer, calcium sulfate in an amount equivalent to from 10 to 60 percent by weight of calcium sulfate hemihydrate, up to 5 percent by weight of a cross-linking compound for said polyvinyl acetate, and from 0 to 5 percent by weight of defoamer.

2. The method of claim 1 wherein said partially hydrolyzed vinyl acetate polymer is 88 percent hydrolyzed and said cross-linking compound is boric acid.

3. The method of claim 2 wherein said vinyl acetate polymer has a molecular weight of about 190,000 and is present in said additive in an amount of 57 percent by weight.

4. The method of claim 3 wherein said additive contains 40.5 percent by weight calcium sulfate hemihydrate, 1.5 percent by weight boric acid and 1 percent by weight defoamer.

* * * * *